Dec. 1, 1970   KARL-GEORG HOLSTEN   3,543,583
CIRCUIT ARRANGEMENT FOR CONNECTING DEVICES FOR
PICKING UP MEASURING VALUES TO BE RECORDED
Filed June 11, 1968                                       2 Sheets-Sheet 1

INVENTOR

KARL-GEORG HOLSTEN

BY

AGENT

United States Patent Office 3,543,583
Patented Dec. 1, 1970

3,543,583
CIRCUIT ARRANGEMENT FOR CONNECTING DEVICES FOR PICKING UP MEASURING VALUES TO BE RECORDED
Karl-Georg Holsten, Kassel, Germany, assignor, by mesne assignments, to U.S. Philips Corporation, New York, N.Y., a corporation of Delaware
Filed June 11, 1968, Ser. No. 736,125
Claims priority, application Germany, June 19, 1967, 1,623,799
Int. Cl. G01k 7/02, 7/24
U.S. Cl. 73—341          7 Claims

ABSTRACT OF THE DISCLOSURE

Test apparatus for selectively connecting a plurality of temperature pick-up devices to an indicator includes a bridge circuit having input terminals connected to a DC voltage source and output terminals connected to the indicator. Switching means selectively connect the pick-up devices into one arm of the bridge. A voltage divider is connected in parallel with said one arm of the bridge. A resistor is connected between a tap on the voltage divider and one input terminal of the bridge. The switching means includes at least one switch path for selectively connecting the voltage source to the other bridge input terminal or to the tap on the voltage divider.

---

The present invention relates to a circuit arrangement for connecting devices for picking up measuring values, more particularly temperature pick-ups, to multiple measuring-point commutator which has four switch paths and by which the pick-ups, included in a branch of a measuring bridge supplied from a source of constant voltage, are commutated or switched, the bridge output voltage being applied, if desired after amplification, to the indicating or recording apparatus.

Such arrangements are known per se. They have to provide a means for switching not only the various pick-ups, for example, in the form of resistance thermometers or thermocouple elements, but also the suppresed zero points and measuring ranges.

In such known arrangements, however, a few pick-ups, i.e. the resistance thermometers, are D.C.-interconnected, which is often undesirable. Though in principle no difficulties are involved in relatively separating the pick-ups for direct current by the provision of a corresponding number of switches, this solution is not practical because of the limited amount of space available in the measuring apparatus.

Therefore, an object of the present invention is to provide a circuit arrangement which uses a minimum number of switches and provides for the relative separation of the pick-ups for direct current.

This is achieved by connecting the bridge branch including the pick-up in parallel with a potentiometer, the tapping of which is connected through a parallel resistor to the opposite bridge terminal and to the connection of the bridge voltage source. The pick-ups can be double commutated by means of two switch paths of the commutator. By means of a third switch path, the bridge voltage, in resistance pick-ups, is applied to the bridge diagonal terminal, and in voltage pick-ups with measuring range suppression, to the potentiometer tapping. Finally, the measuring range of the indicating or recording apparatus can be switched by means of the fourth switch path.

The invention will be described more fully with reference to the drawing, in which.

Figure 1:
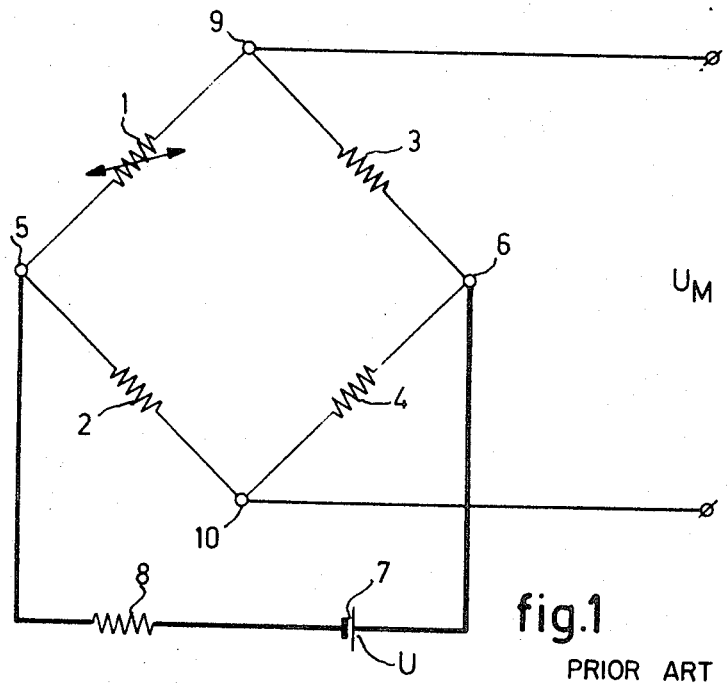
FIG. 1 shows a known circuit arrangement of a measuring bridge.

The known bridge circuit arrangement (FIG. 1) comprises bridge resistors 1, 2, 3, 4,. The bridge supply voltage U is supplied from the voltage source 7 through a pre-resistor 8 to the diagonal input terminals 5, 6. The bridge resistor 1 is in the form of a temperature-dependent resistor, for example, a resistance thermometer. The measuring voltage $U_m$ is applied to the two remaining diagonal terminals 9, 10.

Figure 2:
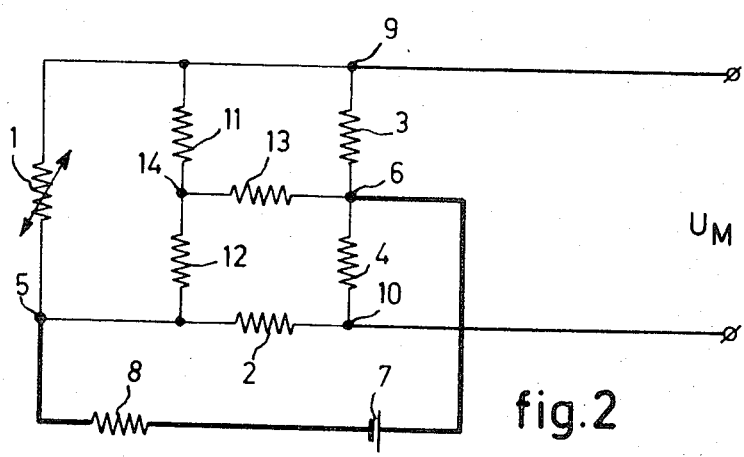
FIG. 2 shows a basic circuit diagram in accordance with the invention developed from the known circuit arrangement.
Figure 3:
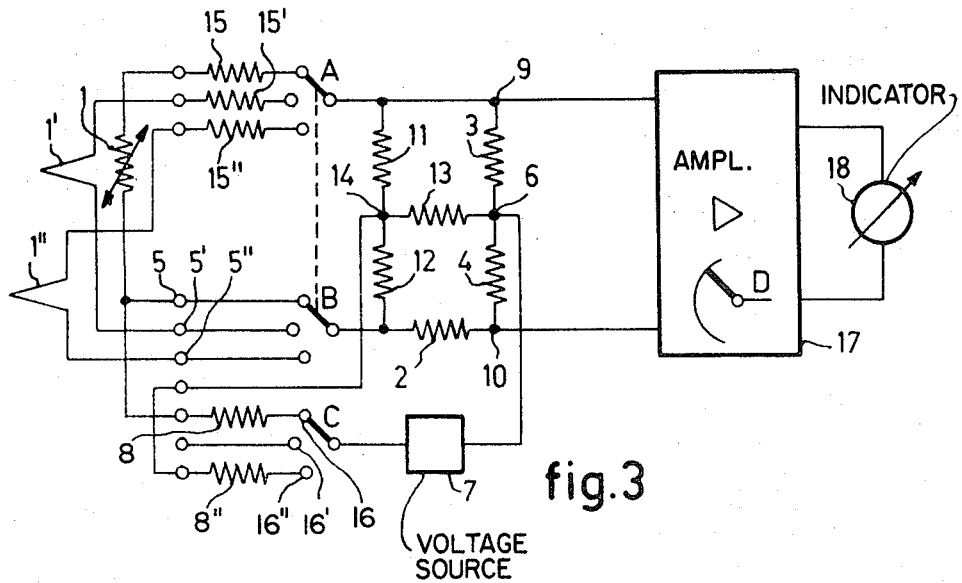
FIG. 3 shows a detailed circuit diagram of the circuit arrangement in accordance with the invention.
Figure 4:
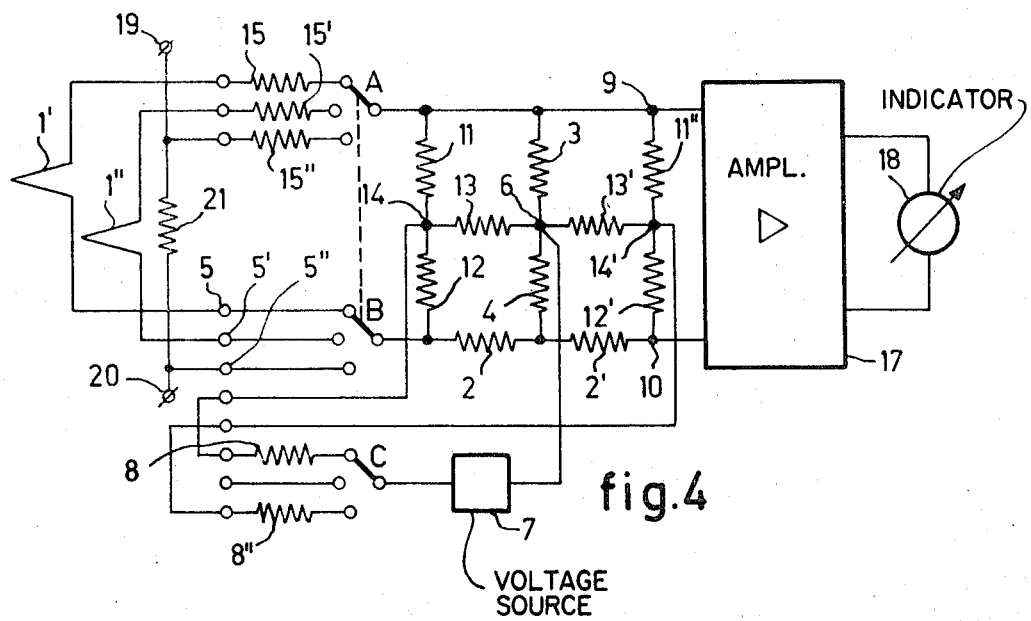
FIG. 4 shows an extension of the circuit arrangement of FIG. 3.

In FIGS. 2 to 4, the points and elements corresponding to those of FIG. 1 are denoted by the same reference numerals.

FIG. 2 shows the modification according to the invention of the known bridge circuit arrangement for use in a network for a deflection method, which is adapted to carry out resistance measurements as well as voltage measurements and voltage measurements with range suppression. This circuit arrangement includes three further resistors 11, 12, 13 with their junction 14. The voltage divider including the series combination of the resistors 11, 12 is connected in parallel with the measuring feeler. A potentiometer may be substituted for the voltage divider. The resistors 3, 4, 11 and 12 are large with respect to the resistors 2 and 13 so that in practice impressed currents in the resistors 1 and 2 are to be taken into account. At one end of the range scale, the voltage drops across the resistors 1 and 2 cancel each other so that $U_M$ becomes equal to O. However, a variation of resistor 1 results in a measuring voltage $U_M$ which increases linearly with the said variation.

For resistance measurements, the bridge current is supplied from a voltage source 7 through a resistor 8 to the bridge input terminal 5, while the other terminal of the voltage source is connected to the fixed bridge input terminal 6. For voltage measurements with range suppression, the bridge current is supplied to the point 14 instead of to the input terminal.

In the circuit arrangement of FIG. 3, this principle is extended to a plurality of temperature pick-ups which can be double-commutated by means of the switch paths A, B, i.e. the resistance thermometer 1 and the thermocouple elements 1′, 1″ which are connected in series with resistors 15, 15′, 15″. A third switch path C permits the switching of the zero point position either to points 16, by including a pre-resistor 8 in series with the resistance thermometer 1, or to point 16″, by switching the bridge voltage from the bridge terminal 5 to the bridge point 14. Finally, provision is made of a fourth switch path D for commutating the sensitivity ranges of the measuring amplifier 17, to the output of which is connected the indicating or recording system 18.

Thus, all switching operations in a multipoint measuring system are carried out by means of only four switch paths, while all the pick-ups are relatively separated for direct current. Thus, the additional advantage is obtained that the individual devices for picking up measuring values can be relatively independently calibrated by means of series resistors 15, 15′, 15″ and 8, 8″.

As to the operation of the circuit arrangement of FIG. 3 described above, it should be noted that with resistance measurement, i.e. when a resistance thermometer is switched into the circuit, a current distribution is effected so that at the beginning of the measuring range both the voltage drop across the series combination of the resistor 15 and the resistance thermometer 1, and the voltage drop across the resistor 2 become equal to zero. When thermocouple elements 1', 1" are switched into the circuit, the resistors 15', 15" and 2 do not exert an unfavorable influence, however. With a zero point suppression carried out by means of the switch path C, a voltage drop is produced across the resistor 13 which causes a current to flow through the resistors 12, 2, 4 of the proper magnitude and polarity so that the desired suppression voltage is produced at the resistor 2. In other words, by switching switch path C to point 16", a voltage drop is produced across resistor 2 that exactly compensates for the thermocouple voltage developed in thermocouple 1", thereby producing a zero output voltage at the zero point of the range scale. A current of the same value flows through the resistors 3, 11 and has a decoupling effect on the resistors connected in the measuring circuit.

An extension of the circuit arrangement described above is shown in FIG. 4. In this figure, resistors 2', 11', 12', 13', and their junction 14', are additionally included. If the bridge voltage of the source 7 is applied through the resistor 8" to the switching point 14', the current flows through the resistor 2' in a manner such that an additional voltage is produced in the measuring circuit which brings about an initial deflection of the scale division indicator, i.e. a positive zero point displacement. This is of particular advantage with current measurements. In this case, the current to be measured is applied to the terminals 19, 20, which results in a voltage drop across resistor 21 which can be measured.

What is claimed is:

1. An electric test circuit for selectively connecting one or more electric pick-up devices to an indicating instrument comprising, a measuring-point commutator having a plurality of switch paths, a measuring bridge including a plurality of interconnected impedance branches and having a pair of input terminals and output terminals, a source of constant voltage, means including first and second switch paths of said commutator for selectively connecting said pick-up devices in one branch of said bridge, means for coupling the bridge output terminals to said indicating instrument, means connecting one terminal of said voltage source to the one bridge input terminal that is opposite said one branch of the bridge, voltage divider means connected in parallel with said one branch of the bridge that includes a pick-up device, a resistor connected between a tapping on said voltage divider and said one bridge input terminal, said commutator including a third switch path for selectively connecting the other terminal of said voltage source to the other bridge input terminal or to the tapping on said voltage divider.

2. A circuit as claimed in claim 1 further comprising a plurality of calibrating resistors connected in series with the voltage source and individual ones of the pick-up devices.

3. A circuit as claimed in claim 1 for current and voltage measurement with range suppression further comprising a second voltage divider means connected in parallel with the output terminals of the bridge circuit, means connecting the second voltage divider tapping through a second resistor to said one bridge terminal and to the other terminal of the bridge voltage source by means of the third switch path.

4. A circuit as claimed in claim 1 wherein said commutator includes a fourth switch path for switching the measuring range of the indicating instrument.

5. Test apparatus comprising a bridge circuit including three impedance arms and having input terminals and output terminals, a plurality of electric pick-up devices, switching means for selectively connecting individual ones of said pick-up devices into a fourth arm of said bridge circuit, a source of DC voltage coupled across said input terminals, indicator means coupled across said output terminals, a voltage divider connected in parallel with said fourth arm of the bridge circuit, a resistor connected between a tap point on the voltage divider and the one input terminal that is opposite said fourth arm of the bridge circuit, said switching means including a first switch path for selectively connecting said voltage source to the other bridge input terminal or to the tap point on the voltage divider.

6. Apparatus as claimed in claim 5 wherein said pick-up devices include at least one thermosensitive resistor and at least one thermocouple and said switching means includes second and third switch paths for selectively connecting each of said pick-up devices into said fourth arm of the bridge circuit.

7. Apparatus as claimed in claim 5 wherein said switching means includes second and third switch paths for selectively connecting each of said pick-up devices into said fourth arm of the bridge circuit, said switching means being arranged so that in one condition thereof said voltage source is coupled to the bridge circuit via a series connection of the first and second switch paths.

References Cited

UNITED STATES PATENTS

| | | | |
|---|---|---|---|
| 2,072,312 | 3/1937 | Obermaier | 73—341 XR |
| 3,107,327 | 10/1963 | Eurenius | 323—75(B)XR |
| 2,731,583 | 1/1956 | Ellis | 323—75(N)XR |
| 2,745,054 | 5/1956 | Leyenberger | 323—75(B) |
| 2,971,379 | 2/1961 | Weisheit | 73—362(R) |
| 3,036,464 | 5/1962 | Beeston | 73—342 |
| 3,252,080 | 5/1966 | Newbold et al. | 323—75(B)XR |

LOUIS R. PRINCE, Primary Examiner

F. SHOON, Assistant Examiner

U.S. Cl. X.R.

73—342, 362; 323—75